US012652484B2

(12) United States Patent
Villeminoz

(10) Patent No.: US 12,652,484 B2
(45) Date of Patent: Jun. 9, 2026

(54) CIRCUMAURAL OR SUPRA-AURAL EARPIECE OF AN AUDIO HEADSET AND ASSOCIATED ASSEMBLY METHOD

(71) Applicant: Focal jmlab, La Talaudiere (FR)

(72) Inventor: Emmanuel Villeminoz, Saint-Etienne (FR)

(73) Assignee: FOCAL JMLAB, La Talaudiere (FR)

( * ) Notice: Subject to any disclaimer, the term of this patent is extended or adjusted under 35 U.S.C. 154(b) by 278 days.

(21) Appl. No.: 18/699,151

(22) PCT Filed: Oct. 4, 2022

(86) PCT No.: PCT/FR2022/051872
§ 371 (c)(1),
(2) Date: Apr. 5, 2024

(87) PCT Pub. No.: WO2023/062301
PCT Pub. Date: Apr. 20, 2023

(65) Prior Publication Data

US 2026/0136128 A1 May 14, 2026

(30) Foreign Application Priority Data

Oct. 12, 2021 (FR) ....................................... 2110781
Jun. 7, 2022 (FR) ....................................... 2205461

(51) Int. Cl.
*H04R 1/10* (2026.01)
*H04R 29/00* (2006.01)

(52) U.S. Cl.
CPC ......... *H04R 1/1075* (2013.01); *H04R 1/1008* (2013.01); *H04R 29/001* (2013.01); *H04R 2400/11* (2013.01)

(58) Field of Classification Search
CPC .. H04R 1/1075; H04R 1/1008; H04R 29/001; H04R 2400/11
(Continued)

(56) References Cited

U.S. PATENT DOCUMENTS 11,272,280 B1 * 3/2022 Minerbi ............... H04R 1/1008
2012/0087517 A1 4/2012 Miyata et al.
(Continued)

FOREIGN PATENT DOCUMENTS

JP H0580090 U 10/1993

OTHER PUBLICATIONS

ISA/EPO International Search Report and Written Opinion for corresponding International Application No. PCT/FR2022/051872 dated Jan. 24, 2023 (12 pages).

*Primary Examiner* — Thjuan K Addy
(74) *Attorney, Agent, or Firm* — Harris Beach Murtha Cullina PLLC

(57) ABSTRACT

An earpiece of an audio headset comprising a front wall, a loudspeaker equipped with a basket assembly and a cap, which are fixed on the front wall. The loudspeaker and the cap are removably fixed on the front wall by the reversible cooperation of mechanical means, located on the cap and on the basket assembly, with corresponding mechanical means located on the front wall. Said mechanical means of the basket assembly comprise at least one protuberance intended to cooperate with a deformable stub of the front wall, and said mechanical means of the cap comprise reception sites of fixing screws of the cap on the front wall, the cap pressing against the loudspeaker so as to guarantee the pressing of the basket assembly against the front wall.

11 Claims, 9 Drawing Sheets

(58) Field of Classification Search
USPC ........................................................ 381/59, 58
See application file for complete search history.

(56) References Cited

U.S. PATENT DOCUMENTS

| | | | | |
|---|---|---|---|---|
| 2018/0103309 | A1 | 4/2018 | Ozawa | |
| 2019/0037324 | A1* | 1/2019 | Darlington ............. | H04R 29/00 |
| 2020/0213703 | A1 | 7/2020 | Yoneyama | |
| 2020/0267487 | A1* | 8/2020 | Siva ..................... | H04R 1/1091 |
| 2022/0086549 | A1* | 3/2022 | Hatfield ............... | H04R 1/1066 |

* cited by examiner

[Fig 1]
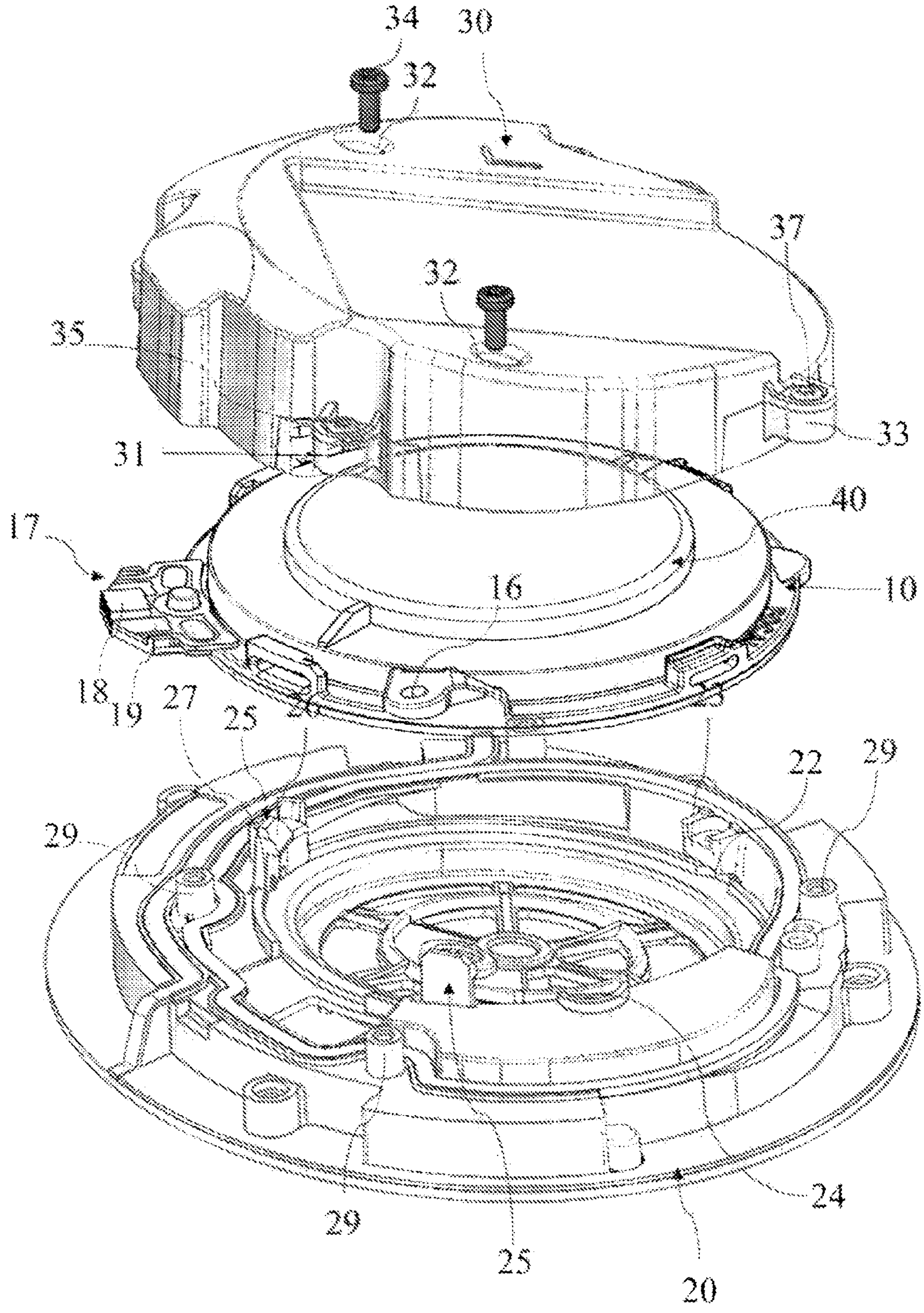

[Fig 2]
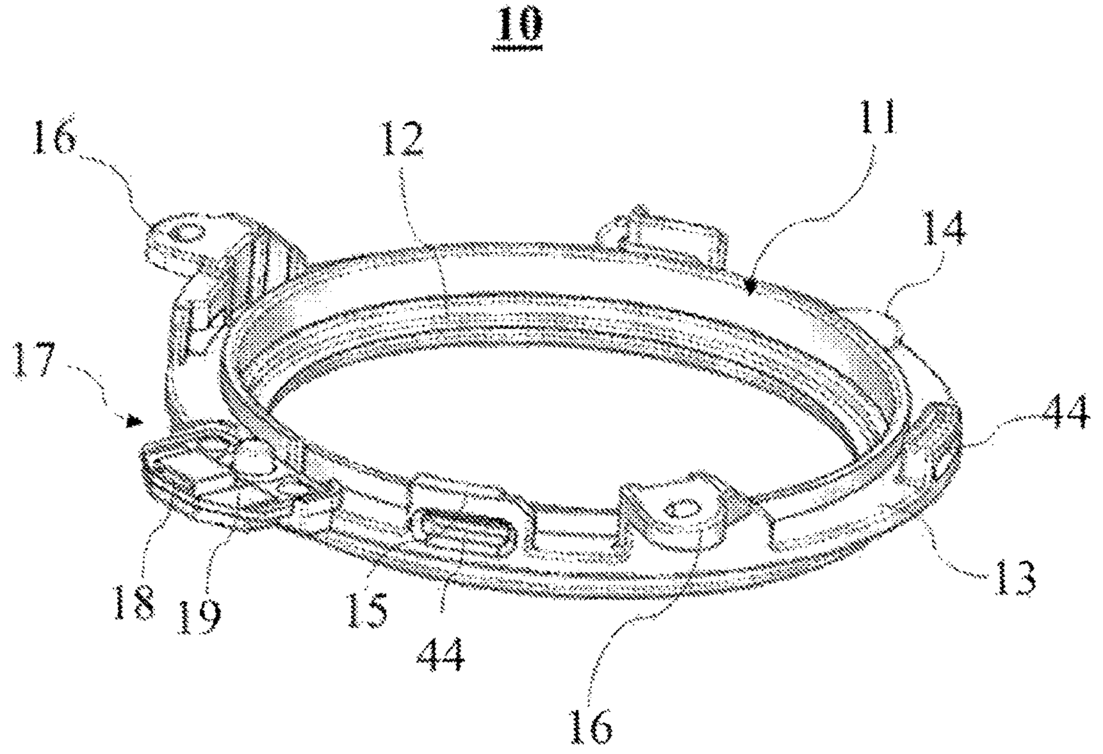
[Fig 3]
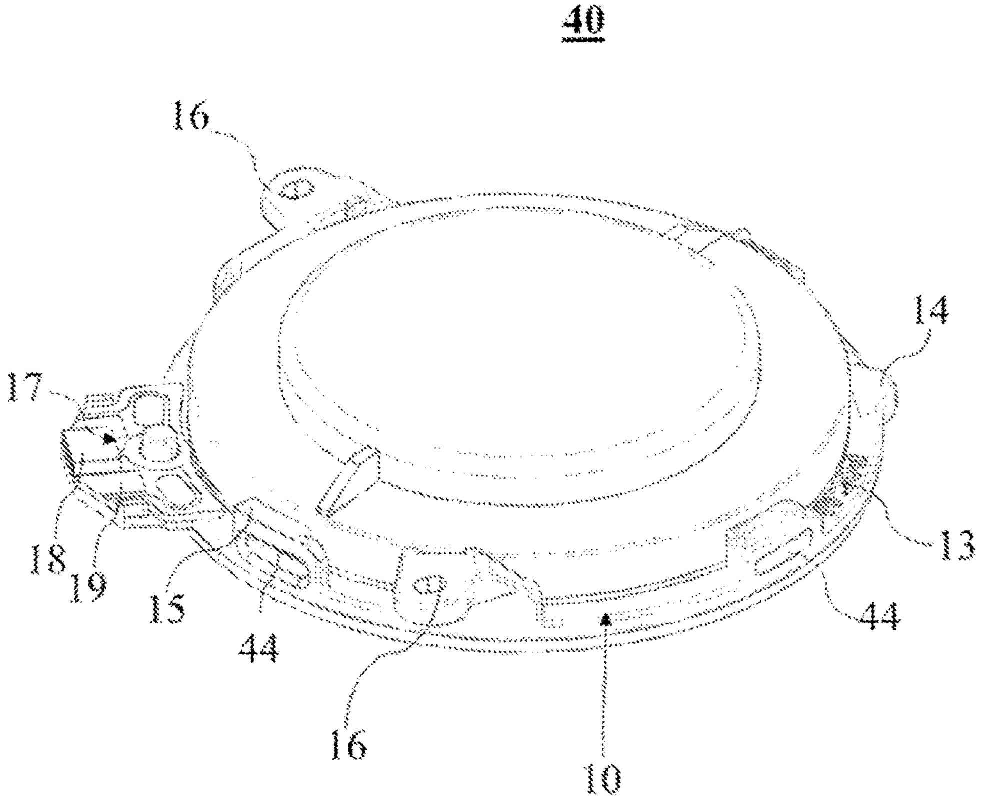

[Fig 4]
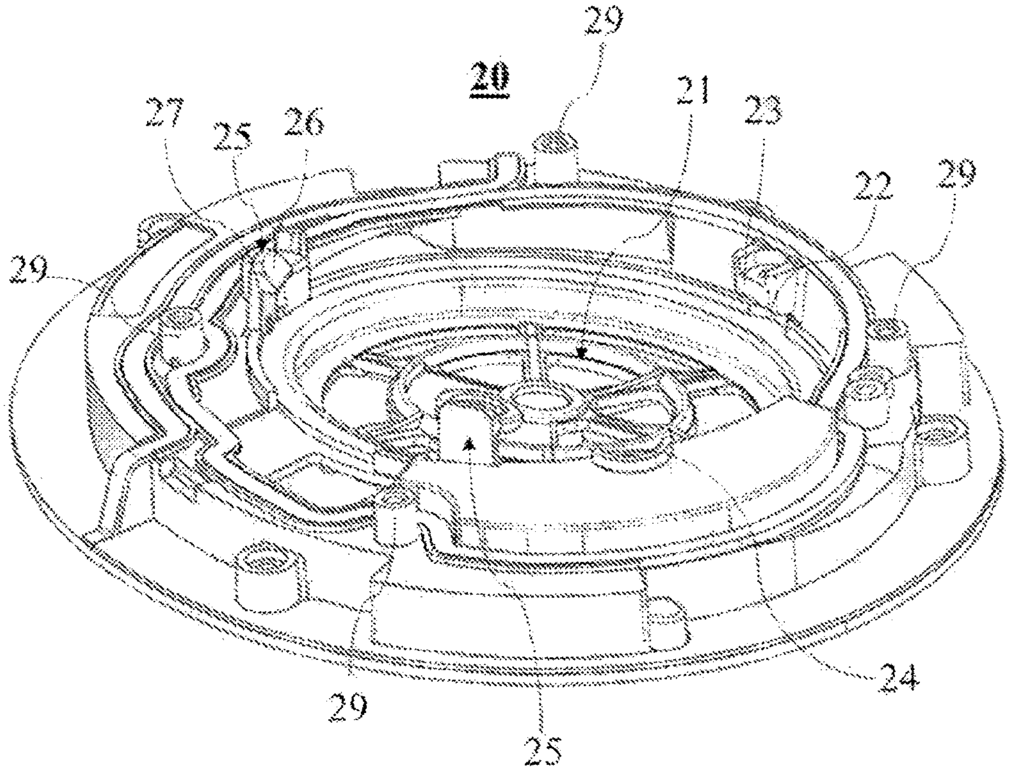
[Fig 5]
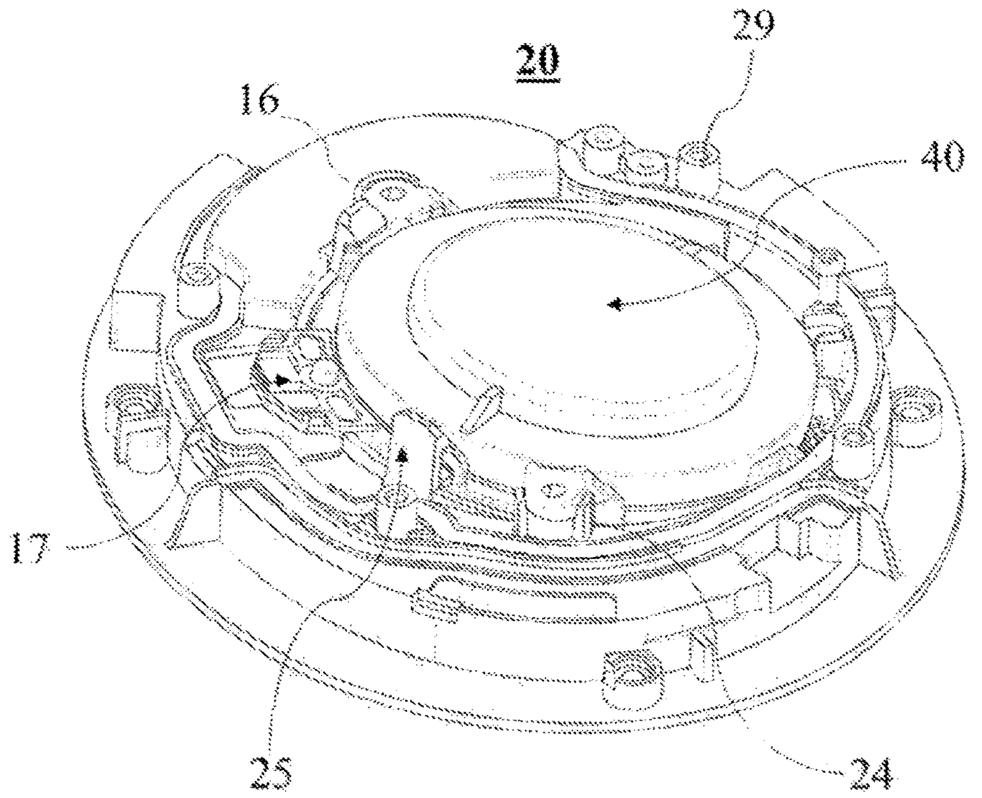

[Fig 6]
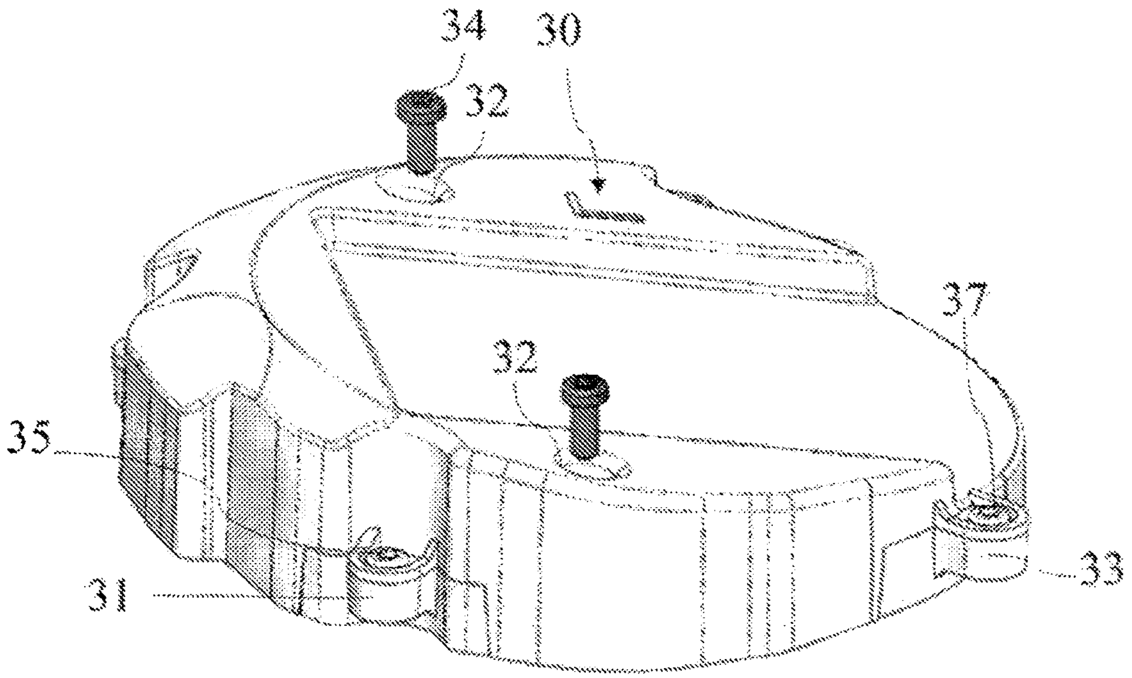
[Fig 7]
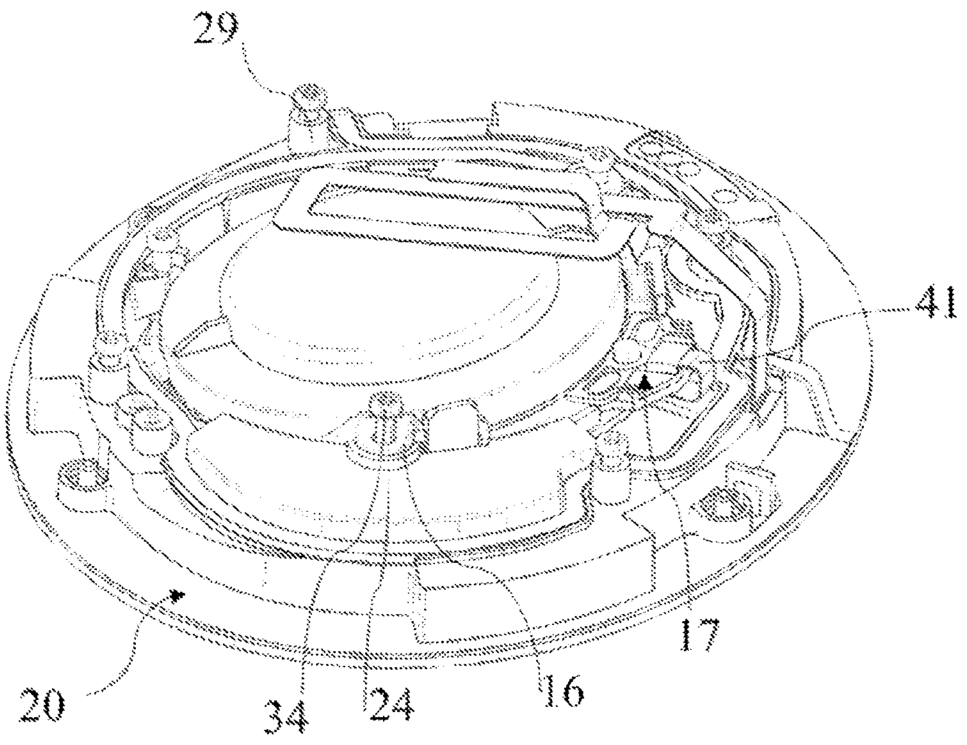

[Fig 8]
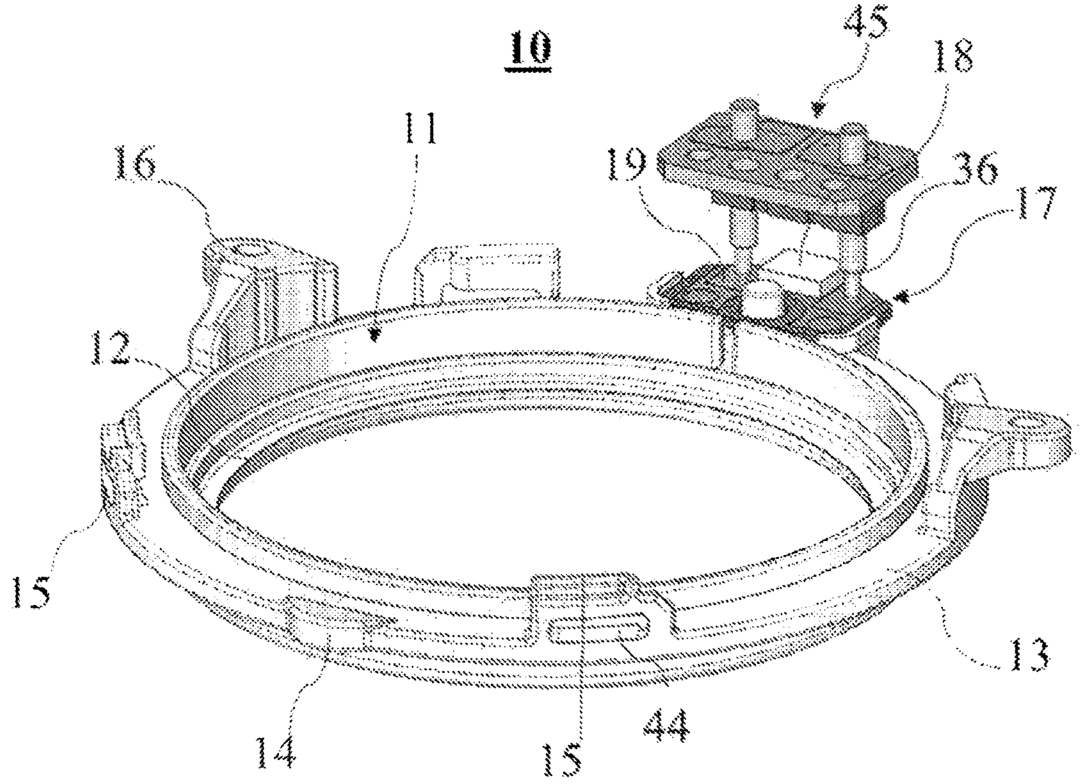
[Fig 9]
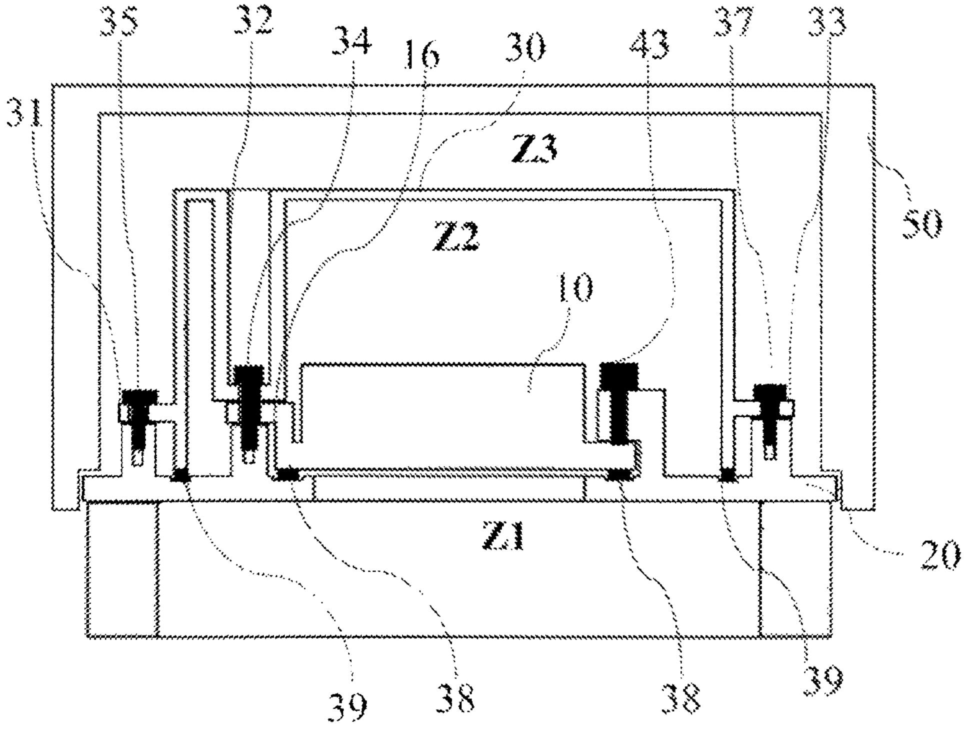

[Fig 10]
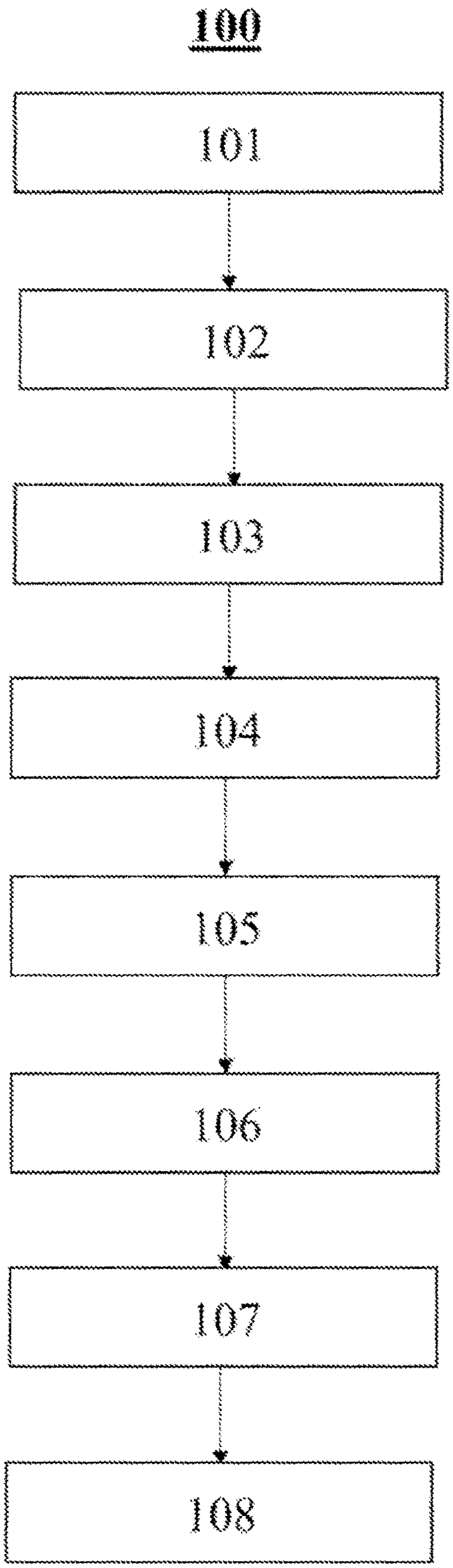

[Fig 11]
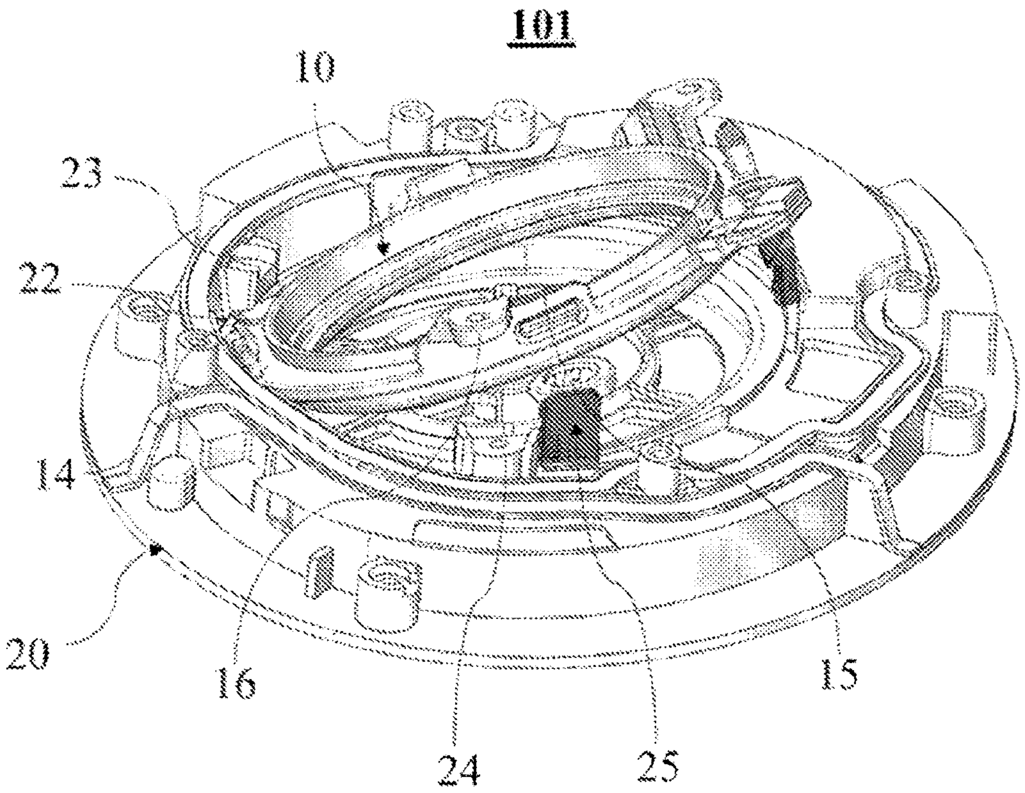
[Fig 12]
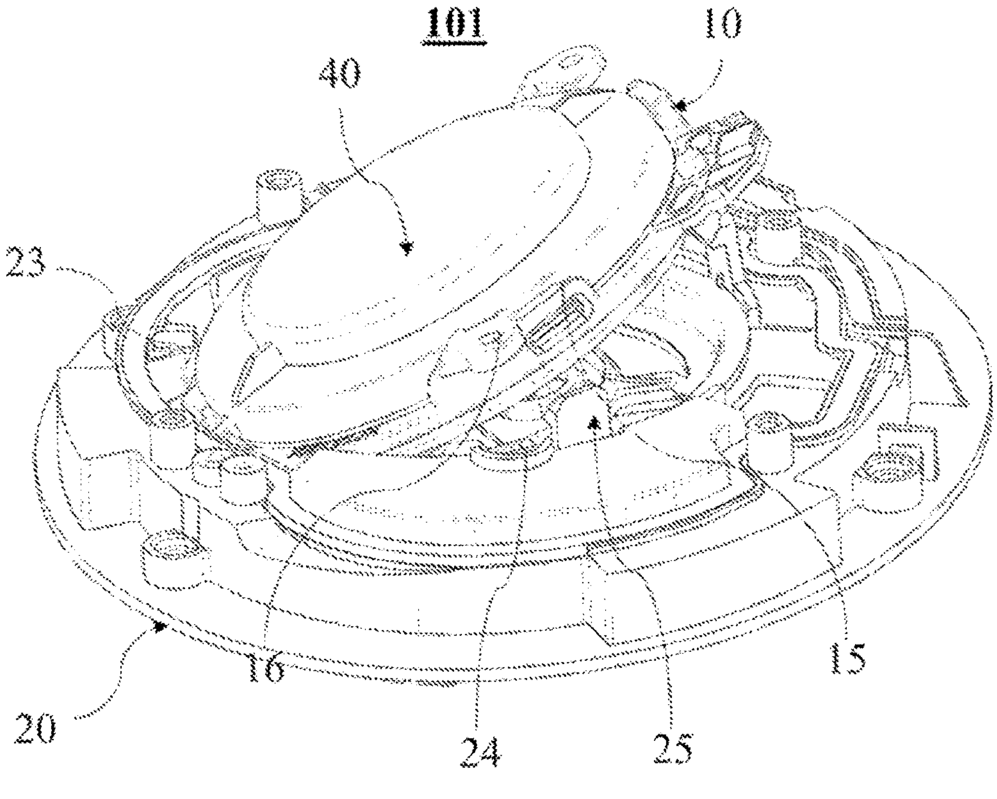

[Fig 13]
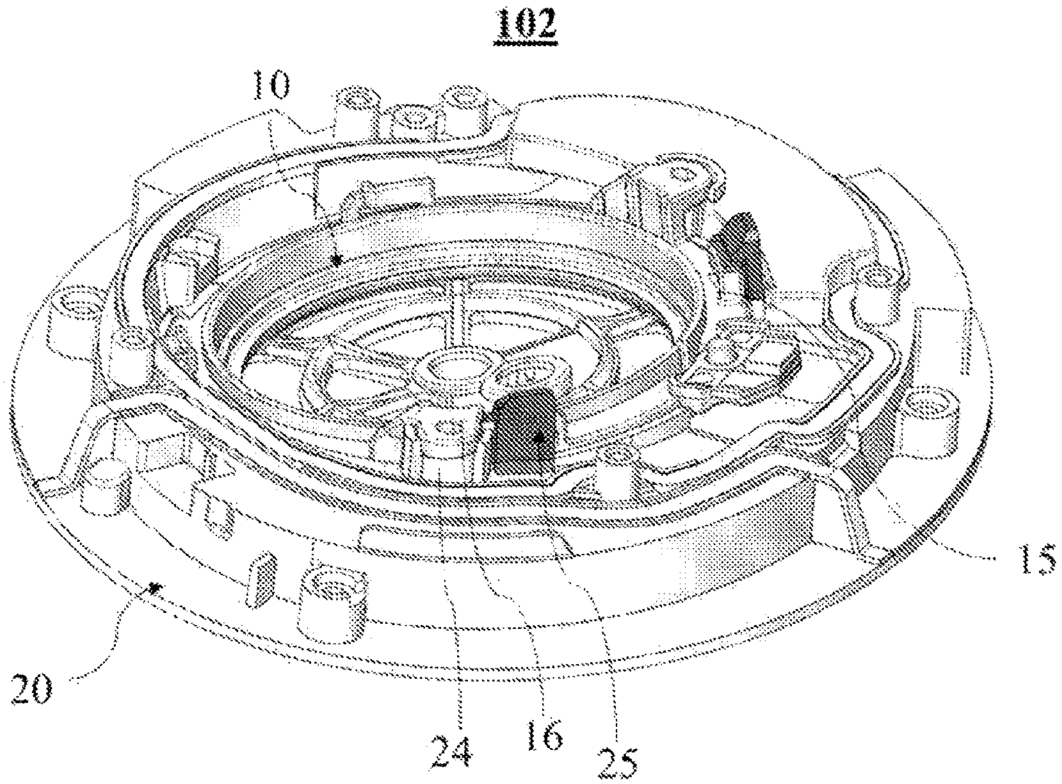
[Fig 14]
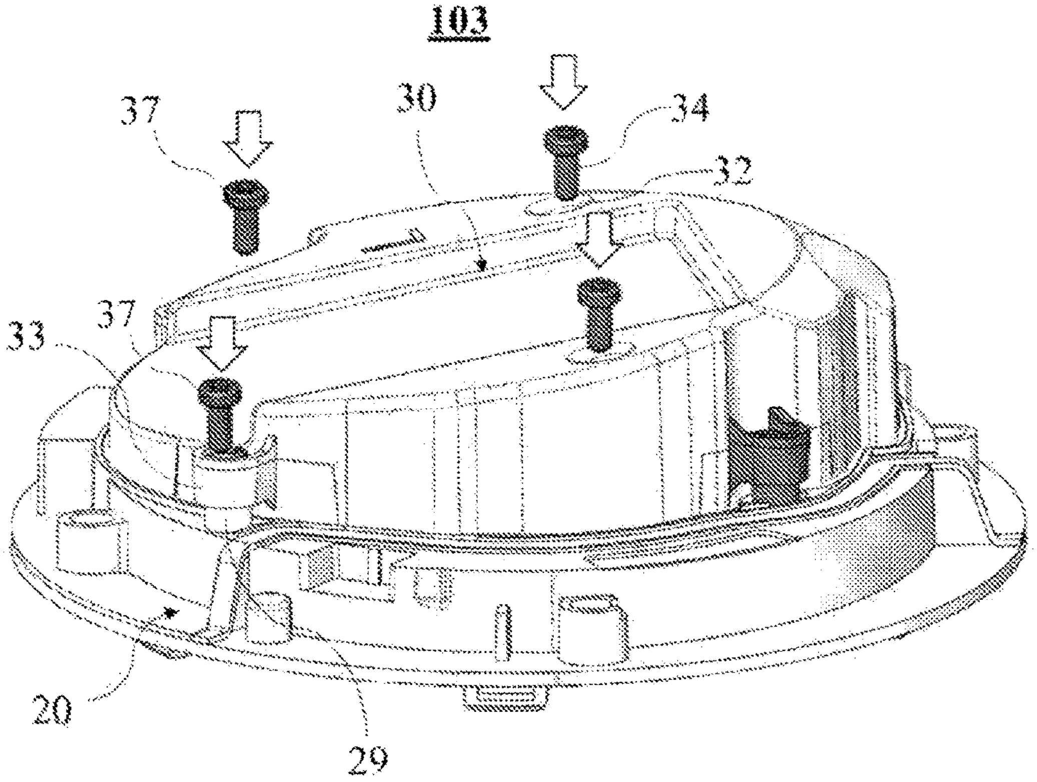

[Fig 15]
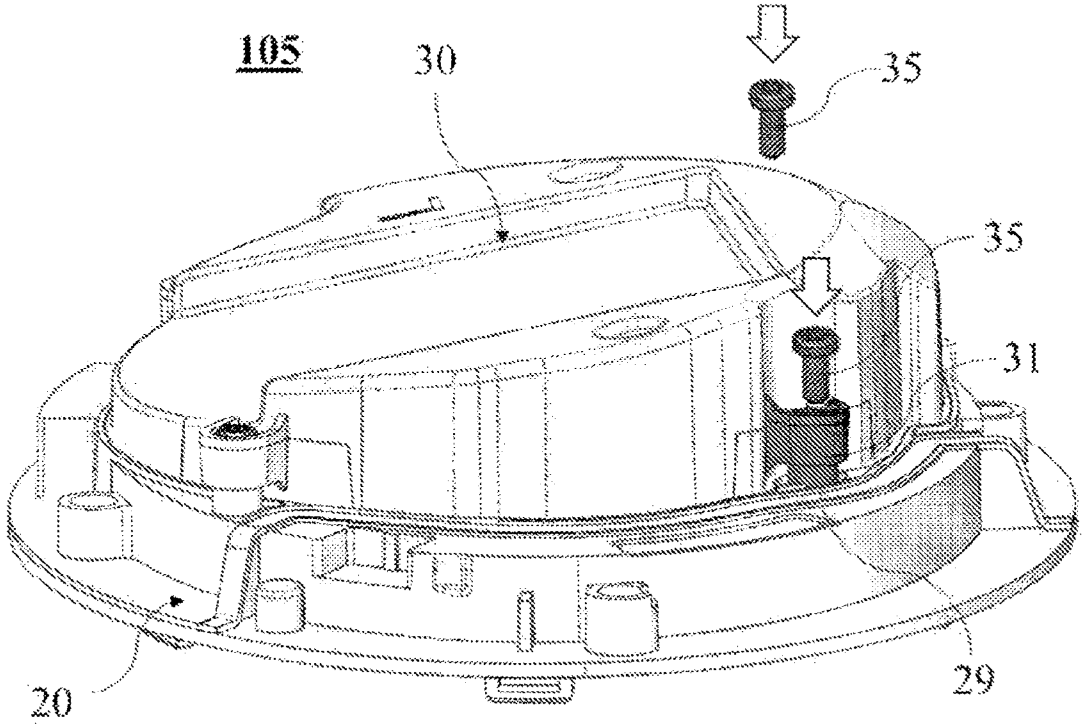
[Fig 16]
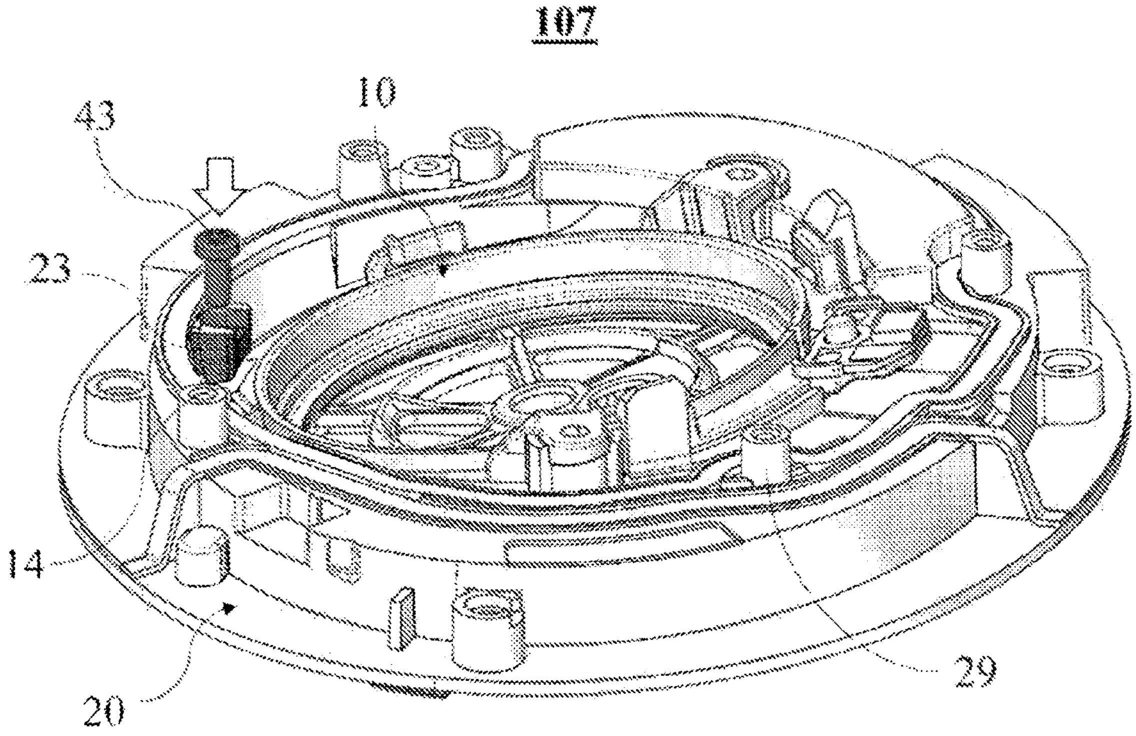

CIRCUMAURAL OR SUPRA-AURAL EARPIECE OF AN AUDIO HEADSET AND ASSOCIATED ASSEMBLY METHOD

CROSS-REFERENCE TO RELATED APPLICATIONS

This application is a national stage application under 35. U.S.C. § 371 of PCT Application No. PCT/FR2022/051872, filed on Oct. 4, 2022, which claims priority to, and the benefit of, French Application No. 2110781 filed on Oct. 12, 2021, and French Application No. 2205461 filed on Jun. 7, 2022, the entire contents of each application being incorporated herein by reference thereto.

TECHNICAL FIELD

The invention relates to the technical field of audio headsets, the earpieces of which comprise at least one loudspeaker.

In particular, the invention relates to a circumaural or supra-aural earpiece of an audio headset. The invention also relates to the assembly method of the headset.

The invention finds multiple applications, in particular for passive or active noise reduction audio headsets.

PRIOR ART

Audio headsets have experienced significant growth in recent years, particularly with the development of a large number of electronic functions integrated into the audio headsets. For example, audio headsets increasingly integrate electronic functions, such as the suppression of external noise to improve user comfort and the quality of the sound content transmitted to the user.

In addition, other electronic functions can also be integrated into these headsets, such as a function allowing the active noise reduction system to be turned off by user action on an earpiece or automatic transmission of telephone communications received by the user on their mobile phone.

Another electronic function consists of recognizing when the user removes their headset from their ears and commanding the electronic functions of the latter to be stopped in order to save battery life.

Although these new functions have led to increasing development in the audio headset sector, the invention relates more generally to all types of audio headsets and also passive audio headsets, that is to say audio headsets integrating very little electronics or even no electronics for controlling the transmitted sound.

The invention relates more specifically to headsets comprising circumaural or supra-aural earpieces, unlike intra-aural earpieces.

These earpieces comprise a cushion positioned on the ear or surrounding the ear of the user, and making it possible to create a frontal listening cavity soundproofed from the external environment. This front cavity is formed by a front wall supporting the loudspeaker at the edge of which the cushion is fixed. Behind this front wall, the earpieces integrate a cap covering the loudspeaker and possibly a shell and electronic means for controlling the loudspeaker.

Notwithstanding the possible presence of vents which improve the behavior of the loudspeaker, the geometry of an earpiece makes it possible to distinguish three zones between which it is preferable to guarantee sealing. Indeed, when this sealing is not optimal, acoustic leaks appear, which tends to degrade the sound reproduction of the headset.

For this purpose, the first zone corresponds to the front cavity, formed at the front of the front wall. The second zone corresponds to the cavity formed between the cap and the assembly formed by the front wall and the loudspeaker, attached to the front wall via seals, also called rear cavity, and the third zone corresponds to the external environment of the cap.

Thus, the sealing between the external environment of the cap and the rear cavity must be guaranteed and the same for the seal between the front cavity and the rear cavity.

Conventionally, the sealing between the front cavity and the rear cavity is obtained by gluing the loudspeaker to the front wall. To do this, a loudspeaker conventionally comprises a mobile assembly and a magnetic motor fixed on a basket assembly. In certain embodiments, the external edge of the mobile assembly is connected to the basket assembly by means of a suspension. The internal edge of the suspension is, for its part, fixed to the membrane of the mobile assembly, the movements of which ensure the generation of acoustic waves. To obtain the desired movements of the mobile assembly, the magnetic motor is fixed on the basket assembly and it generates a constant magnetic field. A variable voltage is applied in the coil of the mobile assembly, which makes it possible to make the mobile part move with more or less amplitude.

Gluing the loudspeaker basket assembly to the front wall nevertheless imposes several technical problems.

Firstly, to ensure effective gluing of the basket assembly to the front wall, it is often necessary to use a chemical glue presenting risks to the health of the personnel fixing the basket assembly on the front wall.

Additionally, this chemical glue is generally harmful to the environment.

In addition, gluing the basket assembly on the front wall greatly complicates the repairability of the earpiece because, to remove the loudspeaker from the front wall, it is necessary to heat the glue until it evaporates. This operation must be carried out under a suction system in order to limit the risk of poisoning. In addition, in some cases it is not even possible to remove this gluing so that the headset cannot be repaired.

Furthermore, during the operations of gluing the basket assembly to the front wall, it is necessary to ensure the limitation of acoustic leaks between the front cavity and the rear cavity of the earpiece. Leaks between these two cavities can occur if the basket assembly is poorly positioned or if part of the basket assembly is not perfectly glued to the front wall. To guarantee limited leaks, when the loudspeaker is glued to the front wall, an operator carrying out the assembly must wait for the glue to dry completely and must then measure the acoustic leaks and check that they are sufficiently limited, preferably completely zero, at the site of the gluing zone of the loudspeaker.

If the operator detects leaks greater than a threshold value in this zone, they can then redeposit a layer of glue to fill these leaks. This operation is therefore very time consuming. To avoid using glue and improve the repairability of an earpiece, it would be possible to use screws to fix the basket assembly on the front wall. However, the basket assembly carries the magnetic motor made up of one or more magnets. Therefore, bringing metal screws near these magnets can cause damage to the loudspeaker if the screws are attracted by the magnets when screwing them in.

Furthermore, the use of screws to fix the basket assembly also poses a problem for implementing this type of process in existing earpiece assembly lines. Indeed, an assembly method generally implemented is broken down into several steps carried out on an assembly line, each step corresponds to an assembly station staffed by an operator.

The assembly method of the loudspeaker in the earpiece generally comprises a first step of positioning the basket assembly on the front wall. This step is carried out by a first operator who conventionally carries out in this step the gluing of the loudspeaker to the front wall using its basket assembly. If necessary, the operator also makes the electrical connections of the loudspeaker to the electronic board of the headset. The operator then moves the assembly formed by the loudspeaker and the front wall to a second station, staffed by a second operator.

The second operator is responsible for screwing the cap onto the front wall. The assembly is then moved to a third station in which the operator measures the acoustic leaks. If acoustic leaks are detected and they exceed a predetermined threshold, an additional layer of glue can be added between the basket assembly and the front wall by removing the cap.

If screws were to replace the glue currently used, the screws could be screwed at the second station equipped with screwing means. However, during transport between the first, second and third assembly stations, the basket assembly would not be fixed on the front wall and could thus move from its position, which could cause additional acoustic leaks to appear and limit the final performance of the headset.

It is also possible to imagine an embodiment in which a system of deformable stubs makes it possible to keep the basket assembly pressed against the front wall. However, in the case where the acoustic leaks exceed the predetermined threshold, additional stubs cannot be installed to reduce acoustic leaks.

The problem that the invention proposes to solve is therefore to find solutions for fixing the basket assembly on the front wall making it possible to limit the appearance of acoustic leaks while being respectful of the environment.

SPECIFICATION OF THE INVENTION

The invention proposes to solve this technical problem by using a circumaural or supra-aural earpiece of an audio headset comprising a basket assembly, on which the mobile assembly and the magnetic motor of the loudspeaker are fixed, and a cap, which are removably mounted on the front wall of the earpiece, via the reversible cooperation of mechanical means.

In this case the mechanical means are hybrid, since they include both deformable stubs and screws.

The deformable stubs make is possible, on the one hand, to guide the positioning of the loudspeaker when assembling the headset and thus prevent the appearance of leaks due to poor positioning and, on the other hand, to hold the loudspeaker against the front wall when moving between different assembly stations.

The screws allow the cap to be fixed on the front wall, so as to sandwich the loudspeaker, via its basket assembly, between the cap and the front wall. Thus, the pressure applied by the cap on the loudspeaker makes it possible to press the basket assembly against the front wall and limit the appearance of acoustic leaks. The basket assembly is therefore held against the front wall thanks to the pressing of the cap, so that by unscrewing the screws of the cap, it is possible to separate the basket assembly from the front wall by moving the deformable stubs.

In other words, according to a first aspect, the invention relates to a circumaural or supra-aural earpiece of an audio headset comprising:

- a front wall,
- a loudspeaker equipped with a basket assembly, fixed on the front wall, and
- a cap fixed on the front wall so as to cover the loudspeaker.

The invention is characterized in that the loudspeaker and the cap are removably fixed on the front wall by the reversible cooperation of mechanical means, located on the cap and on an external wall of the basket assembly, with corresponding mechanical means located on the front wall.

The mechanical means of the basket assembly comprise at least one protuberance intended to cooperate with a deformable stub of the front wall, and the mechanical means of the cap comprise reception sites of fixing screws of the cap on the front wall, the cap pressing against the loudspeaker so as to guarantee the pressing of the basket assembly against the front wall.

Formulated otherwise, the seal between the front cavity and the rear cavity is guaranteed by the combined action of the deformable stubs and the pressing of the cap against the loudspeaker, while the seal between the rear cavity and the environment outside the earpiece is guaranteed by the action of the fixing screws for fixing the cap on the front wall.

In comparison with the prior art in which the loudspeaker is glued to the front wall to guarantee sealing between the front cavity and the rear cavity, the invention is more respectful of the environment and the operators since it is free of the use of glue. In addition, assembly is simplified by the presence of stubs, since they allow the basket assembly to be held in place during the various movements during assembly of the headset. The deformable stubs facilitate assembly and disassembly and save time compared to the use of screws, which must be screwed and unscrewed. In addition, by holding the basket assembly by the pressing of the cap, it is possible to distance the metal screws from the magnetic motor and thus better protect the latter, since the risk of the screws being attracted by the magnets of the motor is more limited. Indeed, the rear cap protects the magnetic motor and the screws cannot cross this protective barrier despite the attraction generated by the magnetic motor on the screws.

In addition, sandwiching the loudspeaker between the cap and the front wall limits the number of screws used. Indeed, in the solutions of the prior art, the screws have one and only one function, namely to ensure the seal between the front cavity and the rear cavity or even to ensure the seal between the rear cavity and the external environment. The invention uses anti-leakage fixing screws passing at the same time through the cap, the loudspeaker basket assembly and the front wall. These screws therefore have the dual function of ensuring the seal between the front cavity and the rear cavity or even ensuring the seal between the rear cavity and the external environment.

In practice, the basket assembly further comprises an insertion tab extending radially toward the outside of the basket assembly and intended to cooperate with a stop housing of the front wall. The presence of such a tab makes it possible to guide the movement of the operator when positioning the basket assembly against the front wall. Indeed, once inserted in the stop housing of the front wall, the tab blocks the front of the basket assembly and guides the tilting of the basket assembly so that the latter can engage correctly in the space formed between the deformable stubs of the front wall. The cooperation of the tab and the protuberances with the stop housing and the deformable stubs therefore makes it possible to limit acoustic leaks linked to incorrect positioning of the basket assembly.

According to one embodiment, the protuberances are two in number and they are intended to be distributed symmetrically on either side of the stop housing. The symmetrical distribution makes it possible to balance the forces applied on the basket assembly and to prevent the latter from being dislodged from its position in the event of an impact, for example during assembly.

Advantageously, the basket assembly further comprises at least two ears in the form of a bracket, the upper portion of which extends radially toward the outside of the basket assembly.

In practice, the cap presses on the loudspeaker at the site of the two ears of the basket assembly. For this purpose, the cap may have support wedges extending toward the inside of the cavity formed between the cap and the loudspeaker, so as to come into contact with the upper face of the ears.

Advantageously, the two ears are intended to come opposite two perforated studs of the front wall. Each ear has a through hole intended to receive an anti-leakage fixing screw. The reception sites of the cap further include openings for accommodating said anti-leakage fixing screws. For example, these openings are made through the support wedges described above. Thus, the anti-leakage fixing screws pass through the cap and the ears in order to be screwed into the bases of the front wall. The anti-leakage fixing screws thus hold the cap, the loudspeaker and the front wall together. In addition, they ensure all the more sealing between the front cavity and the rear cavity, since the pressing of the screw reinforces the pressing of the loudspeaker against the front wall.

Access to the openings of the ears is advantageously from above the cap, which avoids having to disassemble and then reassemble the cap in order to add the anti-leakage fixing screws.

When the headset is of the active type, the basket assembly also comprises a connector comprising two pads and a female plug, the connector being intended to connect the loudspeaker to an electronic board of the headset in two ways. On the one hand, a wire layer connected to the electronic board of the headset can be plugged into the female plug and, on the other hand, closing the cap allows two pins to come into contact with the connector pads. Thus, two types of connection are possible, to best adapt to the different headset designs. In practice, the connection with the wire sheet is used for so-called “active” headsets, that is to say incorporating an electronic board designed for example for the cancellation of external noise. The connection by contact between the pins with the connector pads is used for so-called “passive” headsets, that is to say those which do not include electronics.

The earpiece can be covered with an external shell in which the assembly formed by the front wall, the loudspeaker equipped with the basket assembly and the cap is attached. The shell thus protects the loudspeaker and provides the headset an aesthetic appearance. Alternatively, when the headset is of the passive type, the cap and the external shell are combined. The external shell then plays the role of cap. This cap can then be screwed from the front of the front wall to prevent screws from being visible from the outside.

According to a second aspect, the invention relates to an assembly method of an earpiece as described above, said method comprising the steps of:

- positioning the basket assembly against the front wall of the earpiece by cooperation of the at least one protuberance with the at least one deformable stub of the front wall,
- fixing the cap on the front wall, by screwing in at least one fixing screw, in at least one reception site of the cap, the reception sites having a through opening cooperating with studs of the front wall,
- measuring acoustic leaks between a front cavity formed at the front of the front wall and the rear cavity formed at the rear of the front wall, and
- measuring the acoustic leaks between the rear cavity and the external environment of the cap.

According to a preferred embodiment, the assembly of the basket assembly can be carried out by positioning the insertion tab in the stop housing and by tilting the basket assembly so as to deform the deformable stubs to allow the insertion of the protuberances.

The cap is then fixed on the front wall by screwing anti-leakage fixing screws through the cap, passing through the openings in the cap. The anti-leakage fixing screws penetrate into the openings of the ears in order to be screwed into the studs of the front wall.

If a need to limit leaks between the front cavity and the rear cavity is noted after the acoustic leak measurements, the method includes the steps of removing the anti-leakage fixing screws from the cap, inserting a new anti-leakage fixing screw in the stop housing of the front wall in order to press against the insertion tab of the basket assembly, and reassembling the cap with the anti-leakage fixing screws and new measurement of the remaining acoustic leaks.

Fixing the anti-leakage fixing screws in the ears makes it possible to respond both to a problem of leaks detected between the rear cavity and the external environment of the cap, and to a problem of leaks detected between the front cavity and the rear cavity. Fixing an anti-leakage fixing screw in the stop housing only responds to a problem of leaks detected between the front cavity and the rear cavity.

Likewise, these steps can be carried out in any order, depending on the needs detected after the acoustic leak measurements.

If a need to limit leaks between the rear cavity and the external environment is noted after the measurements of the acoustic leaks, the method further includes the fixing of fixing screws in the reception sites of the cap.

In particular, the method includes the steps of:

- fixing two first fixing screws in the reception sites of the cap, and
- if a need to limit leaks between the rear cavity and the external environment is again observed after a new measurement of the leaks, addition of additional fixing screws.

The measurements of the acoustic leaks between the front cavity and the rear cavity and between the rear cavity and the external environment of the cap can be carried out simultaneously or one after the other.

The assembly method is iterative. It depends on the quality of assembly carried out by the operators, the manufacturing tolerance of the different parts of the earpiece, as well as the acoustic leak limit sought.

Thus, the lower the tolerance of the parts and the more carefully the assembly is carried out, the less likely is the appearance of a need to limit acoustic leaks. The method can then be reduced to very few steps, saving a lot of time.

Conversely, if dimensional variations are observed on the stubs or in the thickness of the cap material, acoustic leaks may appear, which requires adding steps to the method. The number of steps of the method can also depend on the acoustic leak limit sought. The more it is sought to produce a headset with limited leaks, the lower the acoustic leak limit sought is and the more likely the method will require steps of measuring and correcting leaks in order to achieve the desired performance.

For this high-end headset type, fixing screws will thus be used more systematically than for a headset meeting less strict criteria.

BRIEF DESCRIPTION OF THE DRAWINGS

The manner of carrying out the invention, as well as the advantages which result therefrom, will emerge clearly from the description of the embodiments which follow, in support of the appended figures in which:

FIG. 1 is an exploded perspective view of the assembly formed by the loudspeaker equipped with its basket assembly and the cap, attached on a front wall, according to a first embodiment of the invention, FIG. 2 is a perspective view of a basket assembly according to a first embodiment of the invention, FIG. 3 is a perspective view of the loudspeaker equipped with the basket assembly of FIG. 2, FIG. 4 is a perspective view of a front wall according to a first embodiment of the invention, FIG. 5 is a perspective view of a loudspeaker equipped with a basket assembly according to FIG. 2, mounted on the front wall of FIG. 4, FIG. 6 is a perspective view of a cap according to a first embodiment of the invention, FIG. 7 is a perspective view of a loudspeaker according to FIG. 3, mounted on the front wall of FIG. 4, and means of connection with the electronic board of the headset, FIG. 8 is a perspective view of a basket assembly according to FIG. 2 and another means of connection, FIG. 9 is a sectional view of an earpiece according to an embodiment of the invention, FIG. 10 is a flowchart representing the steps of the assembly method of a loudspeaker of FIG. 3 inside each earpiece of a headset, and verification of the compliance of the fixing with respect to the acoustic leaks, FIG. 11 is a perspective representation of the first step of the method of FIG. 10, comprising a basket assembly according to FIG. 2.

FIG. 12 is a perspective representation of the first step of the method of FIG. 10, comprising a loudspeaker according to FIG. 3.

FIG. 13 is a perspective representation of the second step of the method of FIG. 10, FIG. 14 is a perspective representation of the third step of the method of FIG. 10, FIG. 15 is a perspective representation of the fifth step of the method of FIG. 10, FIG. 16 is a perspective representation of the eighth step of the method of FIG. 10.

DETAILED DESCRIPTION OF THE EMBODIMENTS

As illustrated in FIG. 1, a circumaural or supra-aural headset earpiece comprises a front wall 20, on which is attached an assembly formed by a basket assembly 10 supporting the loudspeaker 40 and a cap 30 covering the loudspeaker 40.

The geometry of the earpiece makes it possible to identify three distinct zones, as illustrated in FIG. 9. The first zone Z1 corresponds to the front cavity, formed at the front of the front wall 20. The second zone Z2 corresponds to the cavity formed between the cap 30, the front wall 20 and the loudspeaker 40, also called rear cavity, and the third zone Z3 corresponds to the external environment of the cap 30.

As illustrated in FIGS. 2 and 3, the basket assembly 10 of the loudspeaker 40 has a substantially circular shape. The central ring 11 of the basket assembly 10 comprises an internal wall 12 intended to receive the mobile assembly and an external wall 13 comprising said mechanical means. The loudspeaker 40, which includes the mobile assembly, the motor and the basket assembly 10, is intended to fit into a central opening 21 of the front wall 20, illustrated in FIG. 4. The motor of the loudspeaker 40 can be attached to the basket assembly 10, for example by means of the housings 44. The motor is thus fixed by the rotation of fins in the housings 44.

In particular, the external wall 13 of the basket assembly 10 comprises a rigid insertion tab 14 extending radially toward the outside of the basket assembly 10. The insertion tab 14 may have a semi-circular shape or even a rectangular shape. The insertion tab 14 is intended to cooperate with a stop housing 22 of the front wall 20.

The stop housing 22 is surmounted by a protrusion 23 extending radially toward the inside of the front wall 20. Thus, when the basket assembly 10 is inserted into the central opening 21 of the front wall 20, the protrusion 23 blocks any vertical translation movement of the tab 14, thus preventing the basket assembly from being extracted from the central opening 21. As illustrated in FIG. 9, the earpiece can also include seals 38 such as, for example, O-rings extending between the basket assembly 10 and the front wall 20 when the basket assembly 10 is fixed on the front wall 20. Alternatively, the seals are made of closed cell foam such as ethylene-vinyl acetate copolymer foam or EVA foam, or even Poron® foam.

In addition, to limit possible acoustic leaks which may appear with this type of mechanical assembly, the protrusion 23 has a through hole making it possible to accommodate an anti-leakage fixing screw 43 pressing against the insertion tab 14 in order to hold the basket assembly 10 pressed against the front wall 20 at the site of the insertion tab 14 and thus reduce acoustic leaks in this zone. The basket assembly 10 also comprises at least one protuberance 15 intended to cooperate with a deformable stub 25 of the front wall 20.

Preferably, the deformable stub 25 extends perpendicularly to the front wall 20 over a length of between 0.5 and 2.5 cm. The deformable stub 25 comprises a body 27 surmounted by a head 26 having a beveled face, making it possible to force the head 26 to press against the protuberance 15. Thus, when the basket assembly 10 is inserted into the central opening 21 of the front wall 20, the deformable stub 25 retains the basket assembly in the central opening 21.

In a preferred embodiment, the deformable stubs 25 and the corresponding protuberances 15 are two in number and are distributed symmetrically on either side of the stop housing 22.

Furthermore, to limit possible acoustic leaks which may appear with this type of mechanical assembly, the basket assembly 10 also comprises at least two ears 16 intended to come opposite two reception studs 24 for the ears 16. The ears 16 are in the form of a bracket, the upper portion of which extends radially toward the outside of the basket assembly 10. Each ear 16 has a through hole cooperating with a threaded hole of the studs 24, for example a blind hole. The studs 24 are for example cylindrical in shape and extend perpendicularly to the front wall 20. Alternatively, the basket assembly 10 may have only one ear 16, diametrically opposite the insertion tab 14. The holes in the ears 16 and the studs 24 are intended to receive anti-leakage fixing screws 34, inserted from the cap 30, and passing through the hole in the ear 16 in order to be then inserted into the blind hole of the stud 24.

As illustrated in FIG. 6, a cap 30 is attached to the assembly formed by the association of the basket assembly 10 and the front wall 20, illustrated in FIG. 5.

As illustrated in FIG. 9, the cap 30 rests against the loudspeaker 40, for example at the site of the ears 16 of the basket assembly 10. For this purpose, the cap can have protuberances extending toward the basket assembly 10, thus forming support wedges coming into contact with the upper face of the ears 16.

The cap 30 has reception sites 31, 32, 33 of fixing screws 34, 35, 37 of the cap 30 on the front wall 20. Among these reception sites, the cap 30 in particular comprises openings 32 allowing the insertion of the anti-leakage fixing screws 34 into the cavity formed between the cap 30 and the front wall 20 so as not to have to unscrew the cap 30 in order to fix the anti-leakage fixing screws 34 on the ears 16. These openings 32 are for example provided at the site of the support wedges. In this way, the cap 30 comes to rest against the basket assembly 10 of the loudspeaker 40 and allows it to be held pressed against the front wall 20.

As illustrated in FIG. 9, the earpiece can also comprise seals 39 extending between the cap 30 and the front wall 20 when the cap 30 is fixed on the front wall 20.

As illustrated in FIGS. 7 and 8, when the headset is of the active type, the basket assembly 10 can also comprise a connector 17 comprising a female plug 18 allowing the loudspeaker 40 to be connected to the electronic board of the headset. The connector 17 also includes two pads 19.

This connector 17 allows the loudspeaker 40 to be connected to the electronic board of the headset in two ways. This electronic board is for example positioned in the cavity formed between the cap 30 and the front wall 20 or even outside this cavity, between the cap 30 and the external shell.

The first way consists in connecting a wire layer 41, for example of the FPC type, connected to the electronic board of the headset in the female plug 18. The electronic board can be screwed into the external shell 50 of the headset, which is located behind the cap 30. The wire layer 41 then passes through an opening formed in the cap 30 in order to join the electronic board.

The second way consists in bringing into contact a male connector 45 comprising two pins 36 with the two pads 19 of the connector 17. The male connector 45 is preferably located under the cap 30. Closing the cap causes the pins 36 to come into contact with pads 19. Alternatively, the electronic board can be positioned anywhere in the headset.

As illustrated in FIG. 10, the invention also relates to an assembly method 100 of the loudspeaker 40 inside each earpiece and verification of the compliance of the fixing with respect to acoustic leaks. This method can be carried out within a headset assembly line. To do this, several assembly stations are defined. Each station is staffed by an operator.

A loudspeaker 40 is generally directly supplied with its basket assembly 10. Thus, in the remainder of this description, when reference is made to the basket assembly, this implies the presence of all the elements of the loudspeaker 40.

More precisely, as illustrated in FIGS. 11 and 12, the first step 101 of the method consists, for the operator, of positioning the loudspeaker 40 by placing the insertion tab 14 of the basket assembly 10 in the stop housing 22. To do this, the stop housing 22 preferably has a semi-circular shape extending radially outward relative to the center of the loudspeaker 40 when it is fixed on the front wall 20. The insertion tab 14 also preferably has a shape adapted to the semi-circular shape of the stop housing 22. When the insertion tab 14 is inserted into the stop housing 22, the basket assembly 10 can tilt around the pivot formed by the stop housing 22 and be pressed against the front wall 20 so as to deform the at least one deformable stub 25 of the front wall 20 under the action of the at least one protuberance 15 of the basket assembly 10, in a step 102, illustrated in FIG. 13. Preferably, the basket assembly 10 may comprise two protuberances 15 capable of cooperating with two deformable stubs 25. The deformable stubs 25 are preferably positioned with the insertion tab 14 so as to substantially form an equilateral triangle inscribed in the ring of the basket assembly 10. Steps 101 and 102 are carried out by the same operator. Additionally, the connections of the loudspeaker 40 in one of the two ways described above are carried out so as to connect the loudspeaker 40 to the electronic board. The assembly formed by the association of the loudspeaker 40 and the front wall 20 is then transferred to another station, in which a cap 30 can be attached to the front wall 20.

Depending on the embodiments, the next step can consist of inserting two anti-leakage fixing screws 34 through the openings 32. The openings 32 open opposite the ears 16. Thus, as illustrated in FIG. 9, the anti-leakage fixing screws 34 pass in turn through the cap 30, the ears 16 and are inserted into the studs 24 of the front wall 20. These anti-leakage fixing screws 34 thus make it possible to hold at the same time the cap 30, the loudspeaker 40 and the front wall 20. They ensure both the sealing between the front cavity Z1 and the rear cavity Z2 and the sealing between the rear cavity Z2 and the external environment Z3.

Alternatively, in a step 103, illustrated in FIG. 14, the fixing of the cap 30 can be ensured both by screwing the anti-leakage fixing screws 34 and by screwing two first fixing screws 37 into the reception sites 33. The reception sites 33 have a through opening and cooperate with studs 29 of the front wall 20. The studs 29 also include an opening allowing the fixing screws 37 to be screwed. Thus, the fixing screws 37 pass through the reception sites 33 before being inserted into the studs 29, thus holding the cap on the front wall 20.

After fixing the cap 30, the assembly formed by the association of the loudspeaker 40, the front wall 20 and the cap 30 can be moved to another station in which the leaks between the front cavity Z1 and the rear cavity Z2 and the leaks between the rear cavity Z2 and the external environment Z3 can be measured. These measurements can be carried out simultaneously or sequentially without changing the invention. This step 104 makes it possible to determine whether the fixing screws 37 and/or the anti-leakage fixing screws 34 are sufficient to guarantee the limitation of acoustic leaks in accordance with the desired performances. To do this, a microphone can be placed in the front cavity and/or in the rear cavity while the loudspeaker 40 is used to generate sounds over an expected frequency range. Alternatively, it is possible to carry out an electrical impedance measurement.

If a need to limit leaks between the rear cavity Z2 and the external environment Z3 is noted, it is possible, in a step 105 illustrated in FIG. 15, to transfer the assembly formed by the association of the loudspeaker 40, the front wall 20 and the cap 30 to another station and to add additional fixing screws, for example two in number, fixed through the cap 30, passing through the reception sites 31. The reception sites 31 have a through opening and cooperate with studs 29 of the front wall 20.

If a need to limit leaks between the front cavity Z1 and the rear cavity Z2 is noted, it is possible to disassemble the fixing screws 37 and the anti-leakage fixing screws 34 of the cap 30 and remove the cap 30. A new anti-leakage fixing screw 43 can then be inserted, in a step 107, illustrated in FIG. 16, in the protrusion 23 in order to press against the insertion tab 14.

Steps 105 and 107 can be performed in any order without changing the invention.

Finally, step 108 aims to reassemble the cap 30 with the fixing screws 37, 35 and the anti-leakage fixing screws 34 and to measure, in a step 110, the remaining leaks in order to note the compliance of the assembly of the loudspeaker 40 with respect to the desired performances.

To conclude, the invention makes it possible to provide solutions for fixing the basket assembly on the front wall, making it possible to limit the appearance of acoustic leaks while being respectful of the environment.

The invention claimed is:

1. A circumaural or supra-aural earpiece of an audio headset comprising:
- a front wall,
- a loudspeaker equipped with a basket assembly, fixed on the front wall, and
- a cap fixed on the front wall so as to cover the loudspeaker, characterized in that the front wall comprises a deformable stub, and in that the loudspeaker and the cap are removably fixed on the front wall by the reversible cooperation of mechanical means, located on the cap and on an external wall of the basket assembly, with corresponding mechanical means located on the front wall,
- said mechanical means of the basket assembly comprising at least one protuberance intended to cooperate with said deformable stub of the front wall, and
- said mechanical means of the cap comprising reception sites of fixing screws of the cap on the front wall, the cap pressing the loudspeaker so as to guarantee the pressing of the basket assembly against the front wall.

2. The earpiece according to claim 1, characterized in that the basket assembly further comprises at least two ears in the form of a bracket, the upper portion of which extends radially toward the outside of the basket assembly, the two ears being intended to come opposite two perforated studs of the front wall, each ear comprising a through hole intended to receive an anti-leakage fixing screw, that is to say a screw making it possible to hold the cap, the loudspeaker and the front wall together while ensuring sealing between a front cavity (Z1) and a rear cavity (Z2) and sealing between the rear cavity (Z2) and an external environment (Z3).

3. The earpiece according to claim 2, characterized in that the cap presses the loudspeaker at the site of two ears of the basket assembly.

4. The earpiece according to claim 2, characterized in that the reception sites of the cap include openings making it possible to accommodate said anti-leakage fixing screws, so that said anti-leakage fixing screws pass through the cap and the ears, in order to be screwed into the studs of the front wall.

5. The earpiece according to claim 1, characterized in that the basket assembly further comprises an insertion tab extending radially toward the outside of the basket assembly and intended to cooperate with a stop housing of the front wall.

6. The earpiece according to claim 5, characterized in that the protuberances are two in number and are intended to be distributed symmetrically on either side of the stop housing.

7. The earpiece according to claim 1, characterized in that the basket assembly also comprises a connector comprising two pads and a female plug, the connector being intended to connect the loudspeaker to an electronic board of the headset in two ways.

8. The earpiece according to claim 1, characterized in that it further comprises an external shell in which are attached the assembly formed by the front wall, the loudspeaker equipped with the basket assembly and the cap.

9. An assembly method of an earpiece according to claim 1, said method comprising the steps of:
- positioning the basket assembly against the front wall of the earpiece, by cooperation of the at least one protuberance with the at least one deformable stub of the front wall,
- fixing the cap on the front wall, by screwing in at least one fixing screw, in at least one reception site of the cap, the reception sites having a through opening cooperating with studs of the front wall,
- measuring the acoustic leaks between a front cavity (Z1) formed at the front of the front wall and the rear cavity (Z2) formed at the rear of the front wall, and
- measuring the acoustic leaks between the rear cavity (Z2) and the external environment (Z3) of the cap.

10. The assembly method according to claim 9, of an earpiece characterized in that the basket assembly further comprises an insertion tab extending radially toward the outside of the basket assembly and intended to cooperate with a stop housing of the front wall, said method further comprising the steps of:
- positioning the insertion tab in the stop housing and tilting the basket assembly so as to deform the at least one deformable stub in order to allow the insertion of the protuberances,
- fixing the cap on the front wall, by screwing anti-leakage fixing screws through the cap, passing through the openings, the anti-leakage fixing screws penetrating into the openings of the ears in order to be screwed into the studs,
- if a need to limit leaks between the front cavity (Z1) and the rear cavity (Z2) is noted, disassembling the anti-leakage fixing screws of the cap and inserting a new anti-leakage fixing screw in the protrusion of the front wall in order to press against the insertion tab of the basket assembly,
- reassembling the cap with the anti-leakage fixing screws, and new measurement of the remaining acoustic leaks.

11. The assembly method according to claim 1, of an earpiece characterized in that the reception sites of the cap include openings making it possible to accommodate said anti-leakage fixing screws, so that said anti-leakage fixing screws pass through the cap and the ears, in order to be screwed into the studs of the front wall, said method further comprising the step of fixing screws in the reception sites of the cap, if a need to limit leaks between the rear cavity (Z2)

and the external environment (Z3) is noted after the measurement of the acoustic leaks.

* * * * *